June 1, 1937.  C. W. DAKE  2,082,199
FORMING BRAKE DRUMS
Filed March 16, 1936   5 Sheets-Sheet 2

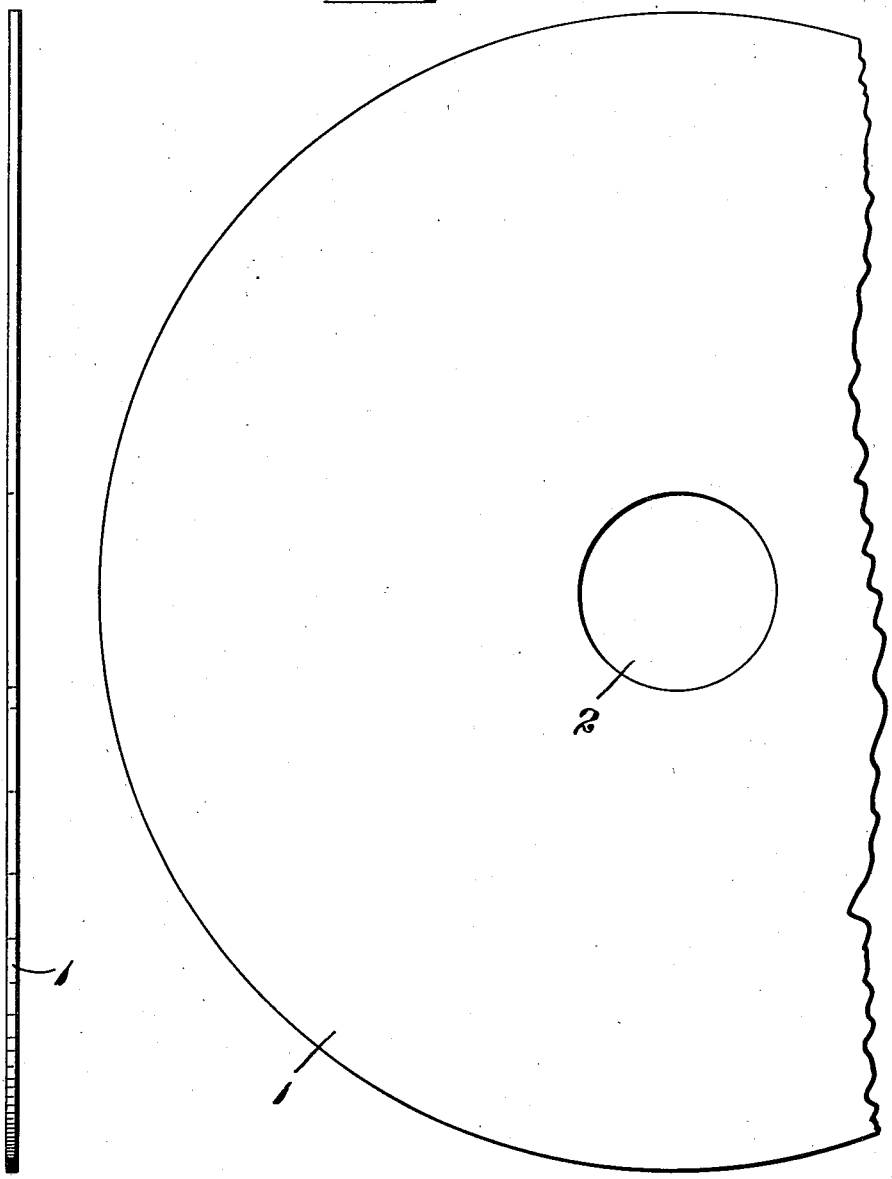

INVENTOR.
Charles W. Dake
BY Liverance and
Van Antwerp
ATTORNEYS.

June 1, 1937. C. W. DAKE 2,082,199
FORMING BRAKE DRUMS
Filed March 16, 1936 5 Sheets-Sheet 3

INVENTOR.
Charles W. Dake
BY
ATTORNEYS.

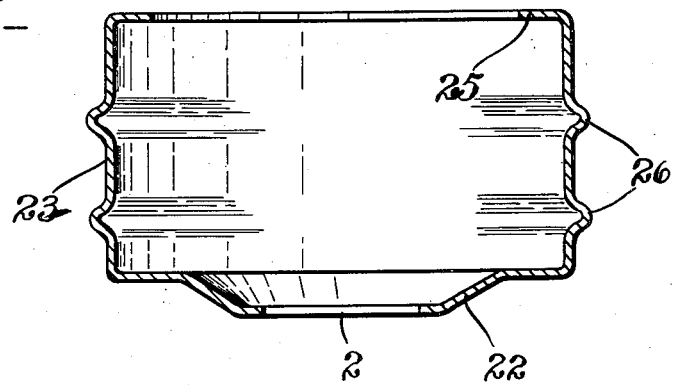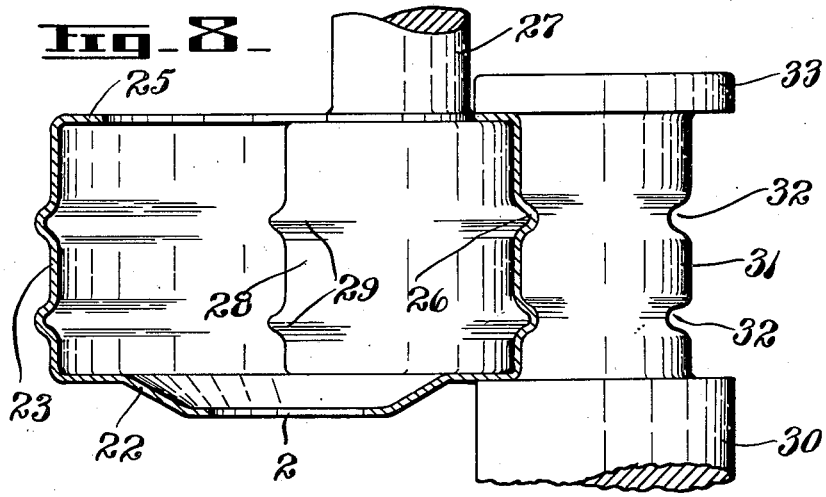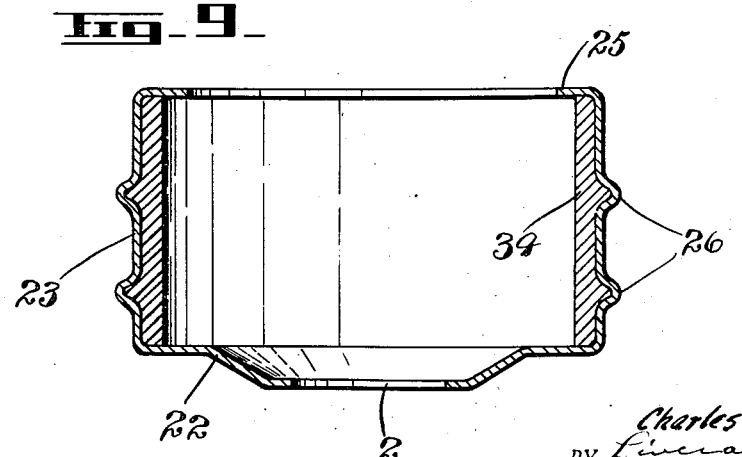

June 1, 1937. C. W. DAKE 2,082,199
FORMING BRAKE DRUMS
Filed March 16, 1936 5 Sheets-Sheet 5
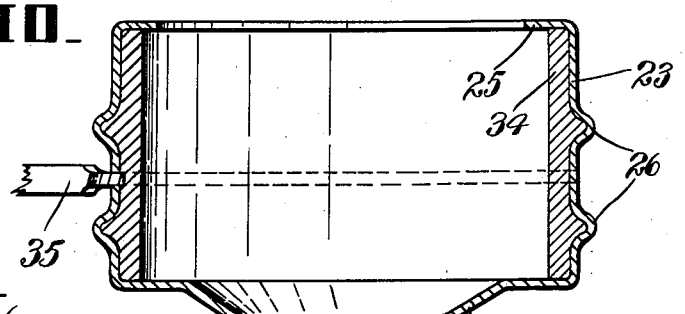
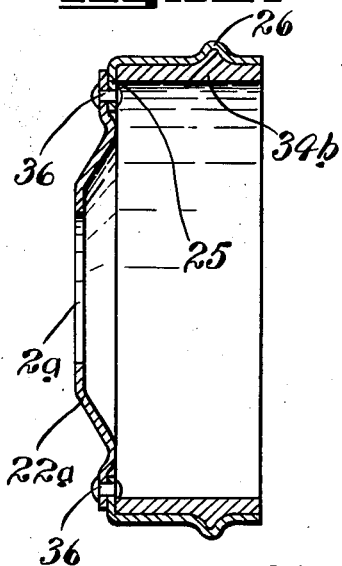
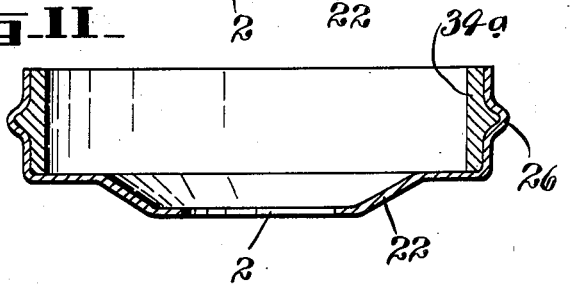
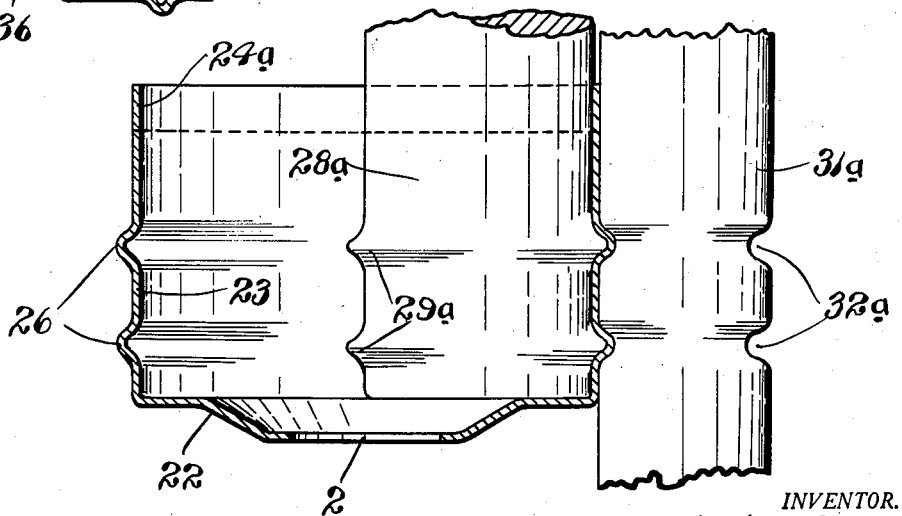
INVENTOR.
Charles W. Dake
BY Liverance and
Van Antwerp
ATTORNEYS.

Patented June 1, 1937

2,082,199

UNITED STATES PATENT OFFICE 2,082,199

FORMING BRAKE DRUMS

Charles W. Dake, Grand Haven, Mich., assignor to Campbell, Wyant & Cannon Foundry Company, Muskegon Heights, Mich., a corporation of Michigan Application March 16, 1936, Serial No. 69,020

7 Claims. (Cl. 29—152.2)

This invention relates to the manufacture of brake drums, particularly those of a composite character wherein an outer supporting and carrying steel shell is lined with a braking lining, preferably of cast iron, fused thereto.

In the manufacture of drums of this character it is a common process to provide a length of steel and roll it into a circular form, bringing the ends of the length of steel together and butt welding them. Flanges are provided at each end of the cylindrical band whereby there is produced, in effect, an annular metal trough of steel into which molten iron may be deposited while the trough-like band is being rotated at sufficiently high speed that the molten metal deposited therein will spread evenly over the inside surface of the band between the inwardly extending flanges. The band in such case is of a width such that it may be cut midway between its ends after being formed into shape and after it has been lined with the cast iron liner, thereby producing two brake ring elements, the drums being completed by welding or otherwise permanently securing a back to the inwardly extending flange which is on each of the two brake ring elements.

The present invention is directed to an improved method of producing composite steel and cast iron brake drums and particularly is directed to an improved manner of forming the steel or wrought metal supporting shell into which the molten metal is deposited for casting. One object of the improvement primarily is to produce the steel or wrought metal portion of the brake drums for composite drums at less cost than heretofore.

Another object is to produce a double width shell of steel or other wrought metal which, after it has been suitably lined with cast metal, may be cut into two parts, whereupon one of the parts will be a completed brake drum, and the other is completed by permanently securing a suitable back to an inwardly extending annular flange thereon. Many other objects and purposes than those enumerated will appear and be readily understood from the following description, taken in connection with the accompanying drawings, in which, Fig. 1 is an edge view and Fig. 2 a plan view of a flat circular sheet of metal from which the supporting shell is drawn.

Fig. 7 is a longitudinal section through the double width drum shell as it is taken from the die.

Fig. 8 illustrates a variation in the method of producing the inturned flange, said variation consisting in rolling the same into shape and position, and at the same time smoothing out any wrinkles or waves left in the metal of the shell by the forming and drawing dies.

Fig. 9 is a longitudinal section showing the double width shell after the cast iron lining is fused therein.

Fig. 10 is a section like that in Fig. 9 showing the manner in which the shell is divided into two parts.

Fig. 11 is a central longitudinal section showing one of the parts made by such division, which part is a complete brake drum.

Fig. 12 is a central longitudinal section illustrating the completed brake drum made by permanently attaching to the other part a supporting back, as distinguished from the brake drum shown in Fig. 11.

Fig. 13 is a view similar to Fig. 8 showing the manner in which a shell may be rolled and smoothed of waves or wrinkles prior to rolling the flange, as in Fig. 8.

Like reference characters refer to like parts in the different figures of the drawings.

The plate of metal from which the drum is drawn or pressed into shape, is of circular form and has a circular opening 2 at the center thereof. Preferably, and in practice, the plate I is of a mold steel in which the carbon content is low, not being over .10% to .15% carbon.

Figure 6:
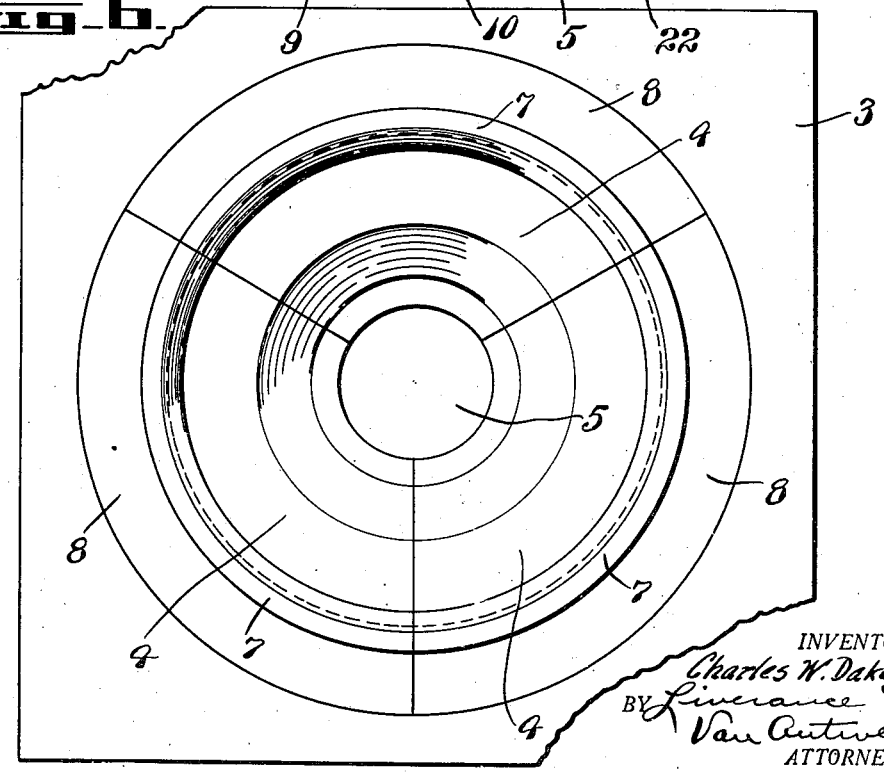
Fig. 6 is a plan view of the die.

In producing the drum shell which is to be lined preferably with a cast iron or an alloy thereof, a supporting block 3 of metal is used, recessed to receive a sectional die 4 which, as shown in Fig. 6, is made of three sections having tapered sides to correspond with the tapered sides of the recess in the block 3 whereby, when the sections of the die are located in the recess of the holding block they are securely held against displacement. The die sections have inwardly extending lower portions which are cut away at their central parts so that when the three sections are properly located in place there is left a circular opening 5 having substantially the same diameter as the opening 2 through the metal plate 1, and which serves as a guide for the pilot of a punch which cooperates with the die.

The sections of the die are grooved at their inner sides making spaced apart continuous grooves 6 around the assembled die. Likewise, the die sections at their upper ends are provided with upwardly extending arc-shaped lips 7 which make a continuous circular lip in the assembled die, and outside of which at the upper end of the die appears a horizontal ledge 8 which may be in the same horizontal plane with the upper side of the block 3.

The punch to cooperate with the die preferably consists of three parts. The innermost part is a cylinder 9 having a suitably shaped lower end to form the back or web of one of the brake drum elements which will be produced. From the lower end of cylinder 9 a centering pilot 10 extends downwardly to pass through the central opening 2 in the sheet metal plate 1, and also enter the guide opening 5 at the bottom of the die in the lower position of the punch. A cylindrical vertically positioned sleeve 11 surrounds the central punch 9, and a seal against the escape of oil under pressure is provided between the cylinder 9 and the sleeve 11 by sealing rings 12 similar to piston rings. A second cylindrical sleeve 13 is located around the sleeve 11 and there is provided sealing rings between the two, like those illustrated at 14, to prevent the escape of oil. At the lower end of the sleeve 13 an annular recess 15 is cut so that at the lower end and the outer portions of the sleeve 13 there is provided a downwardly extending continuous annular lip or ring 16 rectangular in cross section surrounding the recess 15 and which has a lower horizontal face 17 which, in the lowermost position of the sleeve 13, bears against the horizontal ledge 8, thus serving to stop the downward movement of the sleeve 13. At the same time, the annular upstanding lip 7 enters the recess 15 and the upper side thereof strikes against the horizontal upper surface 18 of the recess 15, thereby making a very secure and tight sealing connection between the die and the outside sleeve punch 13 when said sleeve is at its lowermost position. The sleeve 13 directly above and at the inner portions of the recess 15 is provided with a second continuous annular groove or recess 19 having a concave wall as shown, the purpose of which will later be described.

The cylinder 9 is solid except for the provision of a vertical axial passage 20 from its upper end downwardly to within a distance of its lower end. From the lower end of the passage 20 a plurality of radial passages 21 extend outwardly to the outer surface of the cylinder 9.

Figure 3:
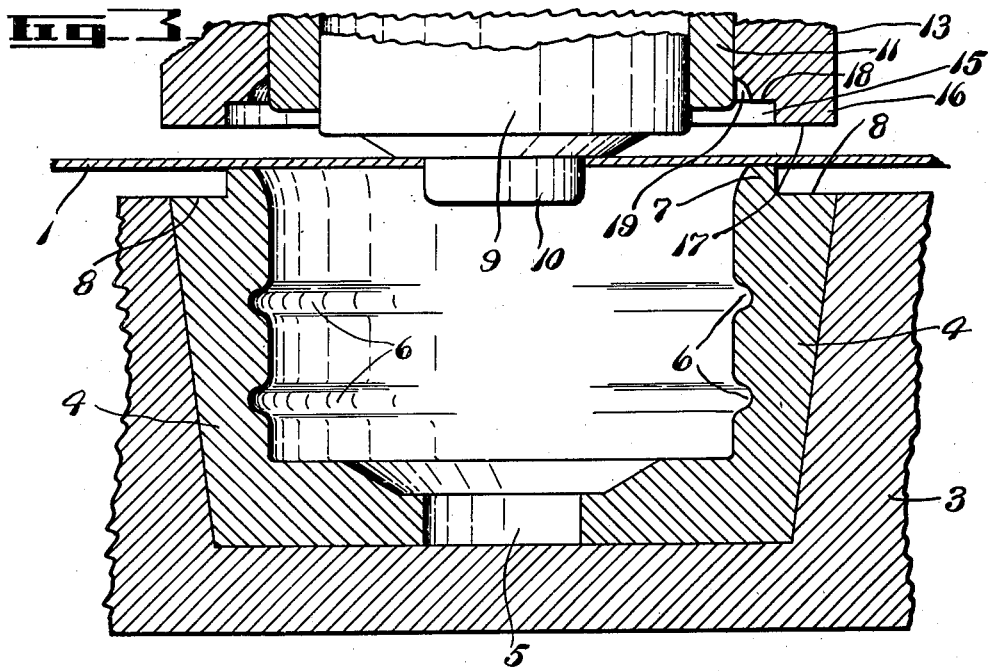
Fig. 3 is a vertical section illustrative of dies and punches for performing the first drawing operations.

In the operation, the flat circular plate 1 of wrought metal is located over the die in a position such that the pilot 10 passes therethrough, as shown in Fig. 3. A downward movement of the cylinder 9 draws the metal into a substantially cup-like shape and the lower end of the punch shapes the metal immediately around the opening 2 in the plate as illustrated at 22 making a back or web for a brake drum. With a mild steel having a low carbon content, the drawing of the steel may be performed in one operation but with a steel having a higher carbon content and, therefore, of a harder type there may be necessistated a drawing into the cup-like form shown in Fig. 4 by a plurality of operations with suitable annealing of the steel between successive or certain of the operations.

Figure 4:
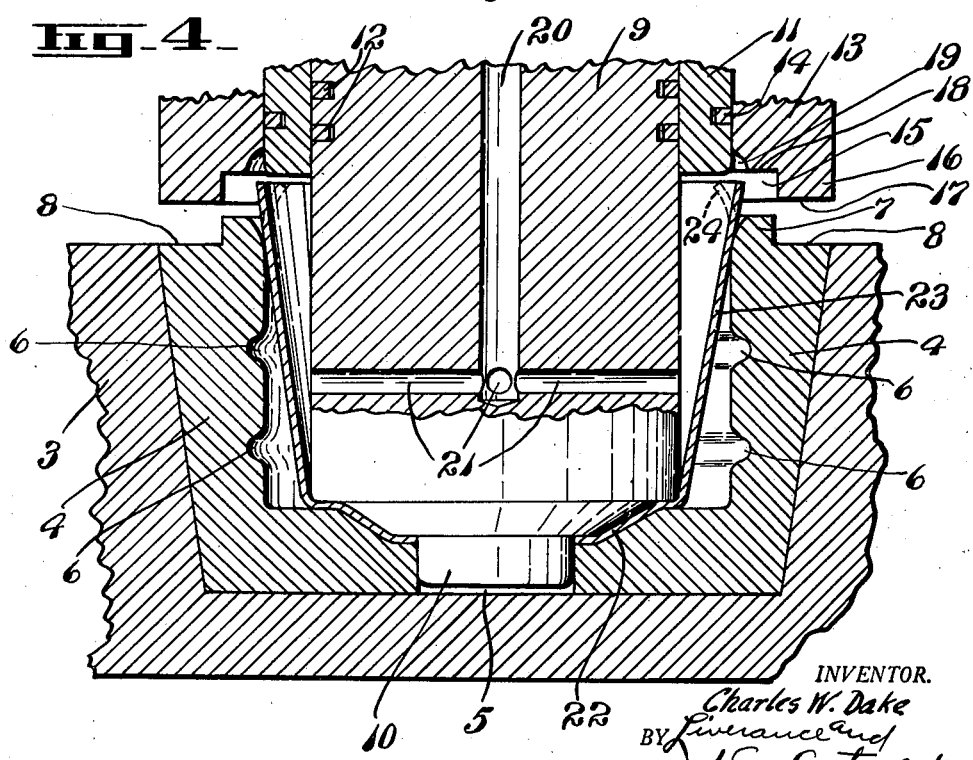
Fig. 4 is a section similar to Fig. 3, showing the dies in position at the final mechanical draw of the shell.

In any case after the substantially cup-like member shown between the die and punch in Fig. 4 has been produced, the next step of the operation is to force down the outer sleeve 13 until the upper edge of the cup-like form produced engages against the concave sides of the groove 19, and is bent inwardly all around the upper ends of the sides 23 as indicated in dotted lines at 24 in Fig. 4. There is also provided a sealing connection between the sleeve 13 and the upper end of the die sections 4.

Figure 5:
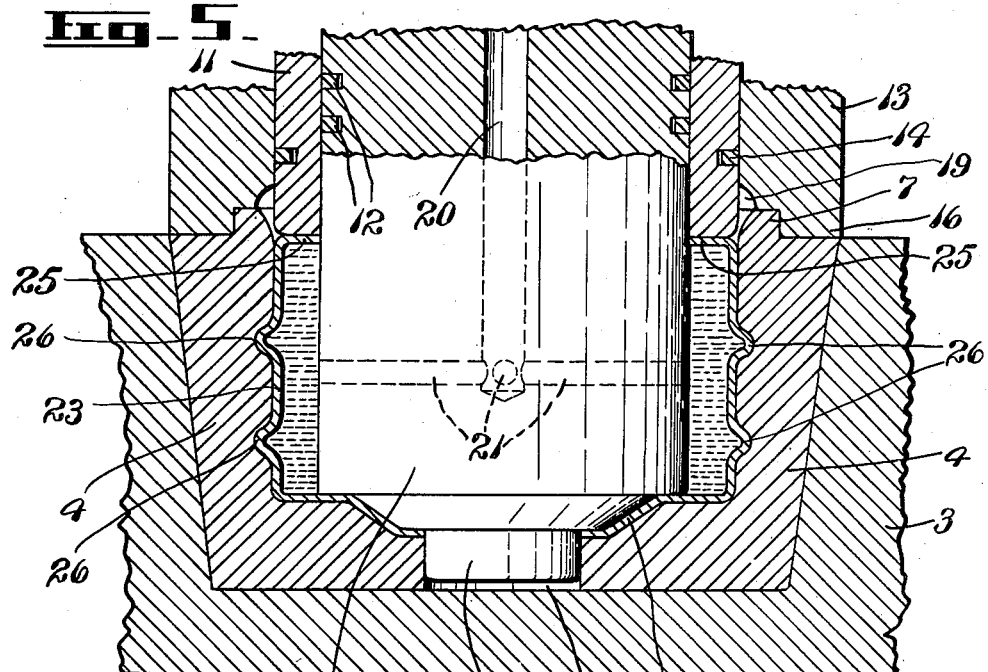
Fig. 5 is a vertical section illustrating the manner in which the inturned flange at one side of the supporting shell is formed and the manner in which heat dissipating ribs in the shell are produced by hydraulic pressure.

The succeeding operation is to move and force the inner sleeve 11 downwardly and either immediately afterward or simultaneously therewith pump oil under heavy pressure through the passages 20 and 21. The downward movement of the sleeve 11 turns the inwardly curved annular section 24 farther inward to a position substantially at right angles to the sides 23 making a continuous annular inturned flange 25 (see Fig. 5). The oil under extremely high pressure expands and distorts and forces the sides 23 into the shape shown in Fig. 5, and forces metal into the grooves 6 of the die whereby there are produced spaced apart radially projecting annular ribs 26 in the sides 23. The wrought metal structure produced is shown in section in Fig. 7.

After it has been produced, the punch parts are elevated and the die sections removed from the block 3, whereupon the wrought metal drum shell, one side of which has a back 22 and the other an inturned annular flange 25 is removed and then may be subjected to a rolling operation illustrated in Fig. 8, for the purpose of smoothing out wrinkles or waves in the thin wrought metal. A shaft 27, having a rolling head 28 from which spaced ribs 29 extend, is placed with the rolling head inside the shell. A second shaft 30 having a rolling head 31 of reduced diameter and with suitably spaced grooves 32 therein, and a flange head 33 at its free end, cooperates with the rolling head 28 at the outside of the drum shell as shown in Fig. 8 whereby the cylindrical sides 23, the ribs 26 and the flange 25 are smoothed and rolled to proper shape with an elimination of any wrinkles or waves which may have been produced in the die operations.

It is of course to be understood that it is not necessary to produce the flange 25 in the first instance. A shell may be produced as shown in Fig. 13 having a back 22 and cylindrical sides 23 but without the flange 25. This structure may then be rolled between rollers 28a and 31a having complementary ribs 29a and grooves 32a to either roll the grooves 26 in their entirety or to smooth the cylindrical sides 23 and grooves already made therein. The portion which later provides the flange 25 is indicated at 24a as extending directly from the cylindrical sides 23a and this flange portion may be rolled inwardly on the dotted line indicated by the rollers 28 and 31 as shown in Fig. 8.

After the drum shell of wrought metal, preferably a low carbon or mild steel, has been produced it is lined with a lining of cast iron. The process of lining the same is now well known, consisting in heating the steel shell to substantially 1500° or 1600° F. protecting its inner surface from oxidizing, rotating it in a suitable rotatable fixture and pouring molten iron at a temperature of about 2850° F. or higher, but preferably not exceeding 3000° F., into the shell while it is rotating. The molten iron will be retained between the flange 25 and the back 22 and a very complete and continuous fusion joinder or connection of the cast iron lining 34 to the steel shell at all points where the iron engages the steel is produced.

The composite drum produced is then divided between its ends by using any suitable cutting tool, as at 35 in Fig. 10. One part thus produced, the lower part in Fig. 10, makes a complete brake drum as shown in Fig. 11 in which the part 22 produced in drawing the shell provides the back or web of the brake drum. The other part has a back 22a permanently secured to the flange 25 as shown in Fig. 12. While I have illustrated rivets 36 as passing through the outer or peripheral portions of the back or web 22a and the flange 25 it is evident that the connection may be by spot welding or other equivalent permanent securing means.

While the width of the two drums shown in Figs. 11 and 12 are different it is, of course, evident that they may be made of the same width if desired.

The method of producing the brake drum described is very practical, useful and efficient and results in marked economy in production. There are no welding seams or oxides produced by welding to be carried by the molten iron, with possibility of poor fusion. The invention is defined in the appended claims and is to be considered comprehensive of all forms of structure coming within their scope.

I claim:

1. The method of making brake drums which consists, in pressing a flat plate of sheet metal into substantially cylindrical form with one end of the cylinder substantially closed by a back, and the opposite end of the cylinder having an inwardly turned annular flange, dividing the cylindrical member between its ends, and attaching a back to the said flange, whereby two completed brake drums are made.

2. The method of manufacturing brake drums which consists, in forming a flat plate of wrought metal into substantially cylindrical form with a back at one end of the cylinder and an inturned annular continuous flange at the other end thereof, lining the cylinder with a lining of cast metal to extend between said flange and back, dividing the cylinder and the lining therein between the ends thereof, and securing a back to said inwardly extending flange, substantially as and for the purposes described.

3. The herein described method of making brake drums which consists, in providing a plate of mild steel having a central opening therein, pressing the same into a die to form the sheet metal plate into a back concentric with the central opening therein and with a cylinder extending substantially at right angles to the peripheral portions of the back, forming the free end portion of the cylinder into an inwardly extending continuous annular flange, dividing said cylinder between its ends transversely of the cylinder, and permanently securing a back to said flange, substantially as and for the purposes described.

4. The method of forming brake drums which consists, in pressing and rolling a plate of flat metal into a form having a back of substantially circular shape with a cylinder extending from the back and with a continuous annular flange at the open end of the cylinder, dividing said cylinder transversely between its ends, and permanently connecting a wrought metal back to said flange.

5. The method of forming two brake drums which consists in providing a flat metal plate, forming it into a cup-like shape having a back comprising the bottom of the cup, and substantially cylindrical walls comprising the sides thereof, forming the free end portions of the cylinder into an inwardly extending continuous annular flange, cutting the cylinder across transversely between its ends, and attaching a metal back to said flange.

6. The herein described method of constructing two brake drums which consists, in forming a wrought metal form of cup-like shape having a back providing the bottom of the cup and substantially cylindrical walls extending from the back and integral therewith providing the sides of the cup, forming an inturned continuous annular flange at the open end and from the metal of the said cylinder adjacent the open end thereof, centrifugally casting a lining of cast metal at the inner side of said cylinder the entire length thereof and between said flange and back, cutting the cylinder and lining transversely across between the ends thereof, and permanently securing a back to said flange.

7. The method of making two brake drums which consists, in providing a cup-like form of wrought metal having a back which provides the bottom of the cup and cylinder walls extending substantially at right angles to said back, and with an annular flange extending inwardly around and at the open end of the cylinder, said cylinder between the back and flange having a length equal to the combined lengths of the braking rings of the two brake drums to be produced, cutting said cylinder across between the ends thereof at a predetermined point thereby producing one brake drum with a back and braking ring, and also a braking ring with a flange extending from one edge thereof, and thereafter securing a back to said flange to complete the second brake drum.

CHARLES W. DAKE.